(12) United States Patent
Teutenberg et al.

(10) Patent No.: US 11,030,137 B2
(45) Date of Patent: Jun. 8, 2021

(54) COMMUNICATION SYSTEM FOR CURRENT-MODULATED DATA TRANSMISSION VIA A CURRENT LOOP

(71) Applicant: Phoenix Contact GmbH & Co. KG, Blomberg (DE)

(72) Inventors: Juergen Teutenberg, Ruethen (DE); Henry Peter, Einbeck (DE); Viktor Oster, Blomberg (DE); Klaus-Peter Säck, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 119 days.

(21) Appl. No.: 16/335,772

(22) PCT Filed: Sep. 22, 2017

(86) PCT No.: PCT/EP2017/074036
§ 371 (c)(1),
(2) Date: Mar. 22, 2019

(87) PCT Pub. No.: WO2018/055090
PCT Pub. Date: Mar. 29, 2018

(65) Prior Publication Data
US 2019/0251054 A1  Aug. 15, 2019

(30) Foreign Application Priority Data
Sep. 23, 2016 (DE) .......................... 102016118004.1

(51) Int. Cl.
*G06F 13/40* (2006.01)
*H04B 3/54* (2006.01)
(Continued)

(52) U.S. Cl.
CPC ........ *G06F 13/4022* (2013.01); *G06F 13/362* (2013.01); *H04B 3/54* (2013.01); *H04B 14/026* (2013.01); *H04L 12/403* (2013.01)

(58) Field of Classification Search
CPC . G06F 13/362; G06F 13/4022; H04B 14/026; H04B 3/54; H04L 12/403
See application file for complete search history.

(56) References Cited

U.S. PATENT DOCUMENTS 5,640,451 A * 6/1997 Schopfer ............... H04M 1/745
                                                         379/377
5,793,754 A   8/1998 Houldsworth et al.
(Continued)

FOREIGN PATENT DOCUMENTS

DE    19900869 A1   7/2000
DE    19911698 A1   9/2000
(Continued)

OTHER PUBLICATIONS

Authorized Officer: Nora Lindner, International Preliminary Report on Patentability issued in counterpart PCT application No. PCT/EP2017/074036, dated Apr. 4, 2019, 12 pp.
(Continued)

*Primary Examiner* — Idriss N Alrobaye
*Assistant Examiner* — Richard B Franklin
(74) *Attorney, Agent, or Firm* — Kaplan Breyer Schwarz, LLP

(57) ABSTRACT

A communication system for current-modulated transmission of data via a current loop—into which a master device and at least one slave device are looped. The at least one slave device has a switching means that is actuable by an evaluation and control unit and that is configured to short a current loop in the closed state, wherein the evaluation and control unit is configured to temporarily close and then
(Continued)

reopen the switching means during a system configuration detection phase. An evaluation and control unit of the master device—is configured to detect when the at least one slave device is looped into the current loop.

11 Claims, 9 Drawing Sheets

(51) Int. Cl.
    *H04L 12/403*     (2006.01)
    *G06F 13/362*     (2006.01)
    *H04B 14/02*     (2006.01)

(56) References Cited

U.S. PATENT DOCUMENTS

| | | | |
|---|---|---|---|
| 6,563,419 B1 * | 5/2003 | Herz | H04L 12/403 |
| | | | 340/12.15 |
| 6,744,243 B2 * | 6/2004 | Daniels | G05F 1/40 |
| | | | 323/280 |
| 2005/0132109 A1 | 6/2005 | Steger | |
| 2013/0264889 A1 * | 10/2013 | Quittek | H04B 3/54 |
| | | | 307/125 |

FOREIGN PATENT DOCUMENTS

| | | |
|---|---|---|
| DE | 10306444 A1 | 9/2004 |
| DE | 102013016584 A1 | 4/2015 |
| EP | 0364082 A2 | 4/1990 |
| EP | 0836967 A2 | 4/1998 |
| EP | 1180278 A2 | 2/2002 |
| EP | 1393280 B1 | 11/2004 |
| EP | 2720051 A1 | 4/2014 |
| EP | 3116169 A1 | 1/2017 |
| JP | 2016-106397 A | 6/2016 |
| WO | 2007/013003 A1 | 2/2007 |
| WO | 2012/080423 A1 | 6/2012 |

OTHER PUBLICATIONS

Office Action issued in counterpart German patent application No. 102016118004.1, dated Jul. 5, 2019, 25 pp.

English Translation of Office Action issued in Japanese Patent Application No. 2019-515858 dated Apr. 1, 2020.

* cited by examiner

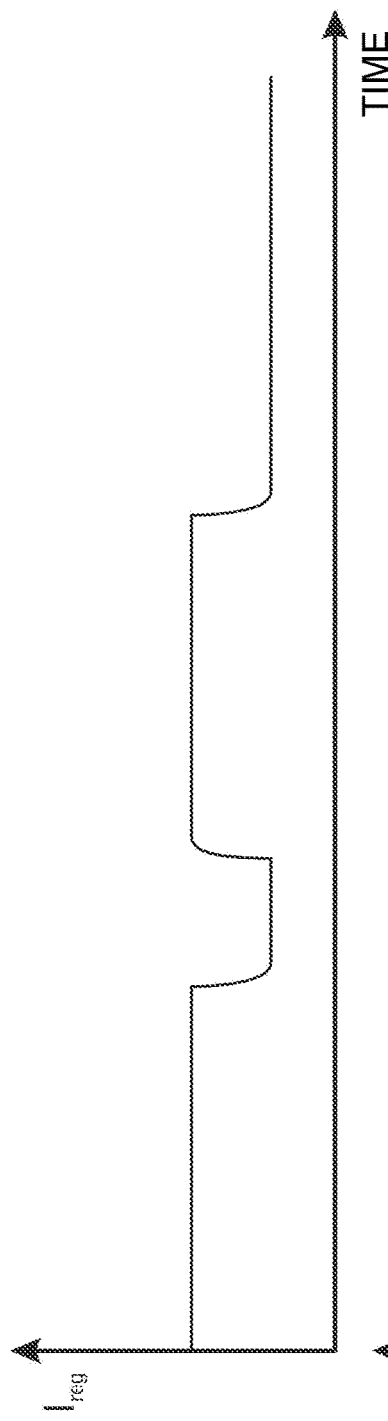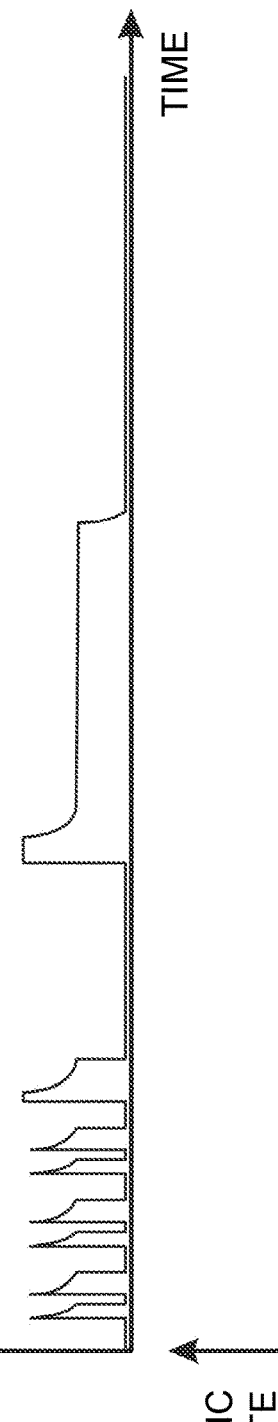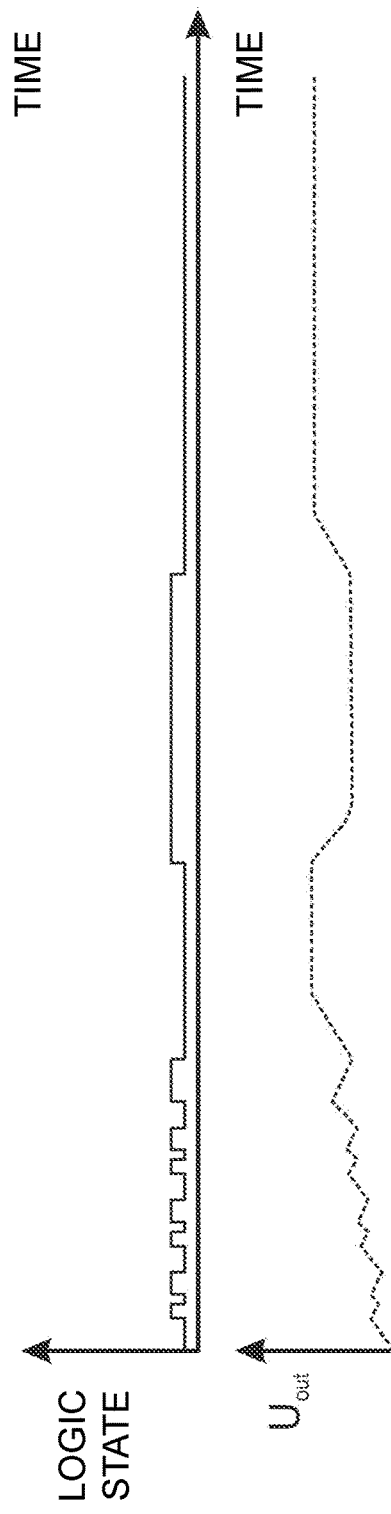

COMMUNICATION SYSTEM FOR CURRENT-MODULATED DATA TRANSMISSION VIA A CURRENT LOOP

FIELD

The invention relates to a communication system for current-modulated data transmission between a master device and at least one slave device. Furthermore, the invention relates to a master device and to a slave device for use in such a communication system, and to a method for automatically detecting the configuration of such a communication system.

BACKGROUND

In automation technology, it is known to use communication systems comprising a central controller and multiple I/O devices, for example, which are interconnected via a transmission medium in order to be able to exchange data with each other.

A communication system implemented in a motor vehicle is known from EP 0 836 967 B1. The communication system has a central unit and a plurality of control modules, which are connected by means of a bus system in order to be able to exchange digital data. The bus system is configured as a single-wire system which is used both for supplying the control modules with electrical operation power and for the transmission of the digital data. The digital data are transmitted from the central unit to the control modules through voltage modulation of a d.c. voltage, while the transmission of data signals from the control modules to the central unit is achieved through modulation of a total load current.

A communication system according to the master-slave principle and implemented in a motor vehicle occupant protection system is also known from EP 1 180 278 B1. Here, a higher-level control unit is connected to functional units via a common data bus. The higher-level control unit transmits data words to the functional units via the data bus, the data words being in the form of a unipolar voltage signal with level states that change between higher and lower voltage values. Thus, a voltage is always applied to the data bus, so that the functional units can send a feedback in the form of current pulses to the higher-level control unit, by a corresponding impedance load.

DE 10 2015 111 112.8 which is a prior patent application according to § 3(2) p. 1 No. 1 German Patent Act, discloses a data transmission system for current-modulated data transmission between a master device and at least one slave device which are interconnected via a current loop.

SUMMARY

The invention is based on the object to further develop the known data transmission system such that a system configuration can be detected automatically.

The starting point of the invention is the prior patent application, according to which data can be transmitted via a current loop through modulation of a quiescent current. According to the quiescent current principle, a predetermined constant quiescent current is constantly flowing through the circuit in an idle state, i.e. during fault-free operation of the data transmission system. A suitable field of application for such a communication system may include industrial, in particular safety-oriented automation systems.

What can be considered as a key idea of the invention is to equip a slave device with a further switching means actuable by an evaluation and control unit, which switching means is temporarily closed during a system configuration detection phase thereby short-circuiting the current loop, and which is subsequently reopened.

The aforementioned technical problem is solved by the features of claim 1 and by the features of independent claims 14 through 16.

BRIEF DESCRIPTION OF THE DRAWINGS

The invention will now be explained in more detail with reference to some exemplary embodiments in conjunction with the accompanying drawings, wherein:

FIG. 8a shows an exemplary time profile of the regulated current of the current source;

FIG. 8b shows an exemplary time profile of the output current of the current source;

FIG. 8c shows an exemplary logic state of the current loop;

FIG. 8d shows a time profile of the output voltage; and

DETAILED DESCRIPTION

Figure 1:
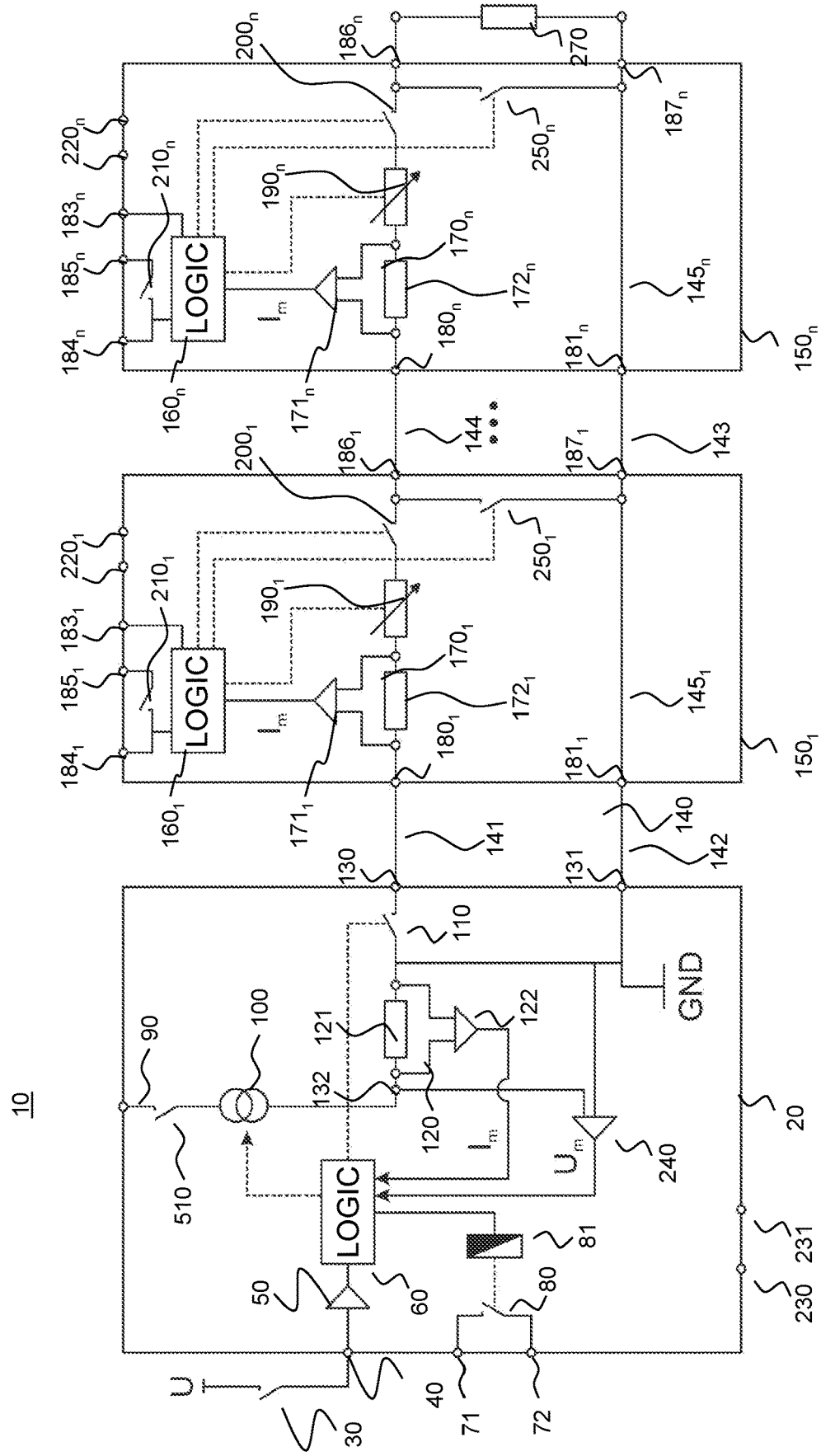
FIG. 1 shows a basic block diagram of a communication system comprising a master device and at least two slave devices.

FIG. 1 shows an exemplary communication system 10 which allows for current-modulated data transmission from a master device 20 to at least one slave device 150$_1$, 150$_n$ and vice versa. The master device and the slave devices are hereinafter also referred to as master and slave, for short. Communication system 10 may be part of an industrial automation system, for example. Data that can be transmitted include, for example, control data such as state change request signals or shutdown commands, process data, parameterization data, diagnostic data, configuration data, and/or safety-relevant data.

By way of example, the communication system 10 includes only two slave devices 150$_1$ and 150$_n$ connected in series to the master device 20. The points between the two slaves 150$_1$ and 150$_n$ indicate that more than two slaves can be connected in series to the master. Thus, the exemplary communication system 10 is configured as a master-slave system.

Communication system 10 comprises a current loop 140 to which the master device 20 and the slave devices 150$_1$ and 150$_n$ are connected, similar to a chain. The current loop 140 is in particular effective as a data bus.

Power supply of the communication system 10 and in particular of the master and slave devices may be achieved via the current loop or preferably via a plurality of separate power supply devices which, however, do not form part of the subject matter of the invention. Preferably, the master 20 and the slaves $150_1$ and $150_n$ each have their own power supply. For example, the master device 20 has ports 90, 230, and 231, to which an external power supply source can be connected for powering the master device 20. Similarly, a respective power supply source for powering the respective slave device may be connected at ports $220_1$ and $220_n$ of slave devices $150_1$ and $150_n$, respectively.

Master device 20 has two connection terminals or connection ports 130 and 131 to which line sections 141 and 142 of the current loop 140 may be connected. Connection terminal 131 is connected to ground, while the connection terminal 130 functions as a signal port. In this way, the slaves $150_1$ and $150_n$ and the master 20 are interconnected via the pair of connection ports 130 and 131, as will be further explained below.

Master device 20 furthermore comprises a first evaluation and control unit 60, which is designated LOGIC in FIG. 1. Evaluation and control unit 60 may include a microcontroller.

Evaluation and control unit 60 is configured, for example, to detect an external switching state which signals an idle state or operation state of the communication system 10. For this purpose, the master unit 20 may have an input 40 to which a switching means 30 can be connected, which supplies the external switching state. For example, the switching means 30 may be an emergency stop switch. The signal generated by the switching means 30 may be supplied to the evaluation and control unit 60 via a signal conditioning unit 50. Furthermore, the master device 20 comprises an electrical current source 100 connected to the current loop 140, which is in particular configured to inject a constant quiescent current into the current loop 140. Depending on the implementation, the level of the quiescent current may be regulated or limited. The electrical current source 100 may be a voltage-controlled current source which, depending on the implementation, may optionally be controlled by the evaluation and control unit 60. The control voltage may be provided, for example, by a d.c. voltage source 520 (shown in FIG. 7) that is connectable to port 90 and is also connected to ground.

Figure 7:
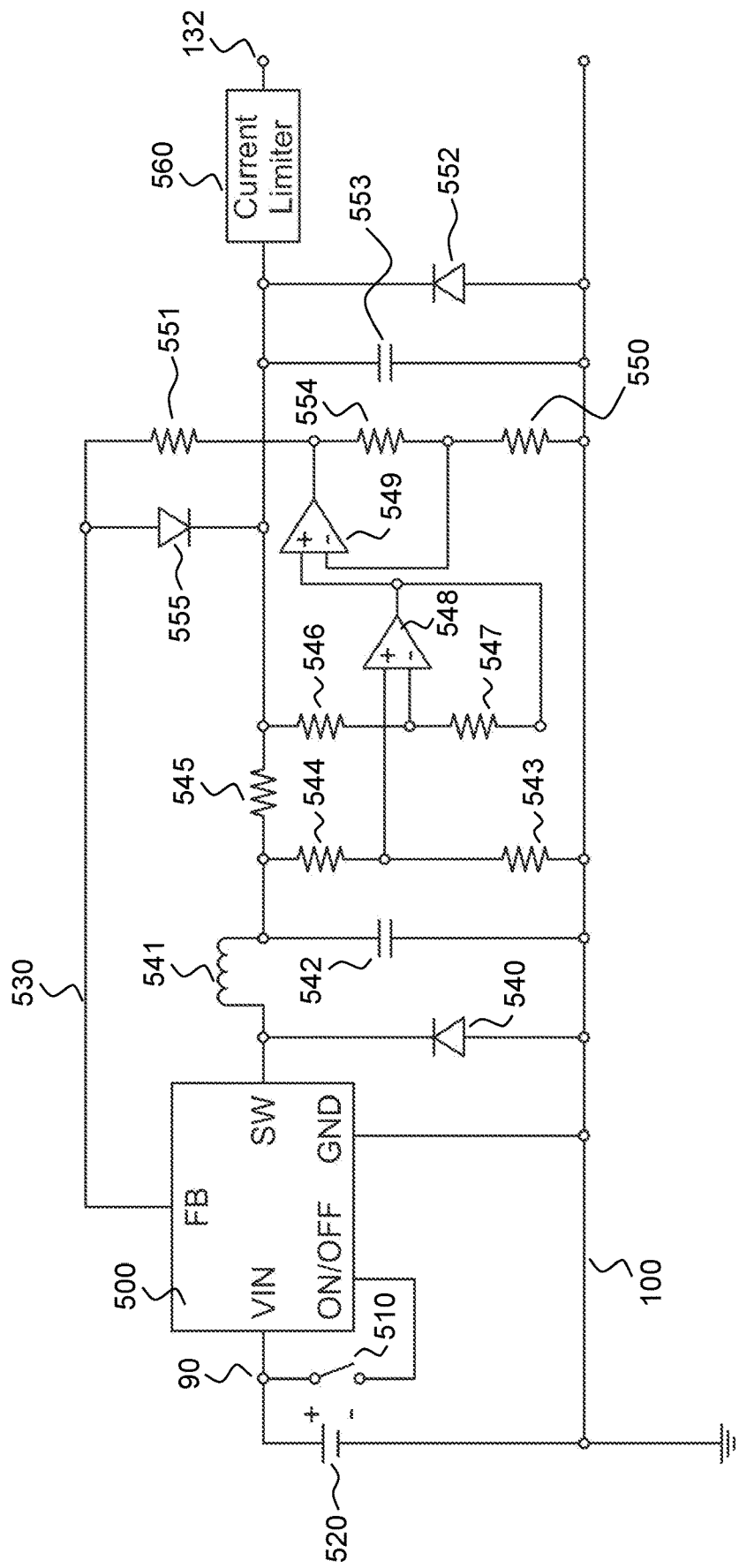
FIG. 7 shows a basic circuit configuration of an exemplary controllable current source shown in FIG. 1.

An advantageous controllable circuit arrangement for implementing the electrical power source is shown in FIG. 7.

Current source 100 is a constant current source comprising, for example, a switched-mode power supply 500 including a regulator and a step-down converter, with current-controlled voltage feedback 530 to the feedback input FB of the regulator. FIG. 7 shows the voltage source 520 which can be connected to the input 90 of the master 20. Switched-mode power supply 500 can be switched on or off via a switch 510 that is actuable by the evaluation and control unit 60 and via an ON/OFF input. In faulty operation, the switched-mode power supply 500 may be switched off, but it does not have to be switched off. In other words, if the current loop 140 is interrupted for a short time or for a longer period of time, the switched-mode power supply 500 does not have to be switched off. An increase in voltage at ports 131 and 132 of the master 20 caused by a short-term interruption of the current loop is compensated by the circuit arrangement shown in FIG. 7.

For current-controlled voltage feedback, a PI circuit comprising a diode 540, a coil 541, and a capacitor 542 is connected to the output SW of switched-mode power supply 500. The anode terminal of the diode 540 is connected to ground, while the cathode terminal is connected to the output SW of switched-mode power supply 500. A first voltage divider comprising resistors 543 and 544 is connected in parallel to the capacitor 542. The center tap of the voltage divider is connected to the non-inverting input of a comparator 548, while one terminal of resistor 543 is connected to ground and one terminal of resistor 544 is connected to the coil 541. The other terminal of coil 541 is connected to the output SW of switched-mode power supply 500. A further voltage divider comprising resistors 546 and 547 is provided, with the center tap thereof connected to the inverting input of comparator 548. One terminal of resistor 547 is connected to the output of comparator 548, which again is connected to a non-inverting input of a further comparator 549. A series resistor 545 is connected to a terminal of coil 541 and to a terminal of resistor 546. A further voltage divider comprises three resistors 550, 551, and 554. One terminal of resistor 551 is connected to the FB input of switched-mode power supply 500, thus it forms part of the current-controlled voltage feedback 530. The other terminal of resistor 551 is connected to the output of the further comparator 549. The anode terminal of a Zener diode 555 may be connected to the feedback terminal FB, for voltage limitation purposes, while the cathode terminal of the Zener diode 555 is connected to series resistor 545. Resistor 554 is connected between the output of the further comparator 549 and the inverting input thereof. Resistor 550 is connected between the inverting input of comparator 549 and ground. A capacitor 553 and a further Zener diode 552 may be connected between the cathode terminal of Zener diode 555 and ground, for voltage limiting purposes, and the anode terminal of Zener diode 552 is connected to ground. A current limiter 560 may be connected between the cathode terminal of Zener diode 552 and connection point 132.

Furthermore, the master device 20 comprises a switching means 110 connected into the current loop 140 and actuable by the evaluation and control unit 60. Switching means 110 is configured to close or interrupt the current loop 140, for example, so as to modulate, i.e. switch on and off, the quiescent current injected into the current loop 140 by the current source 100, for the purpose of transmitting information.

Figure 9:
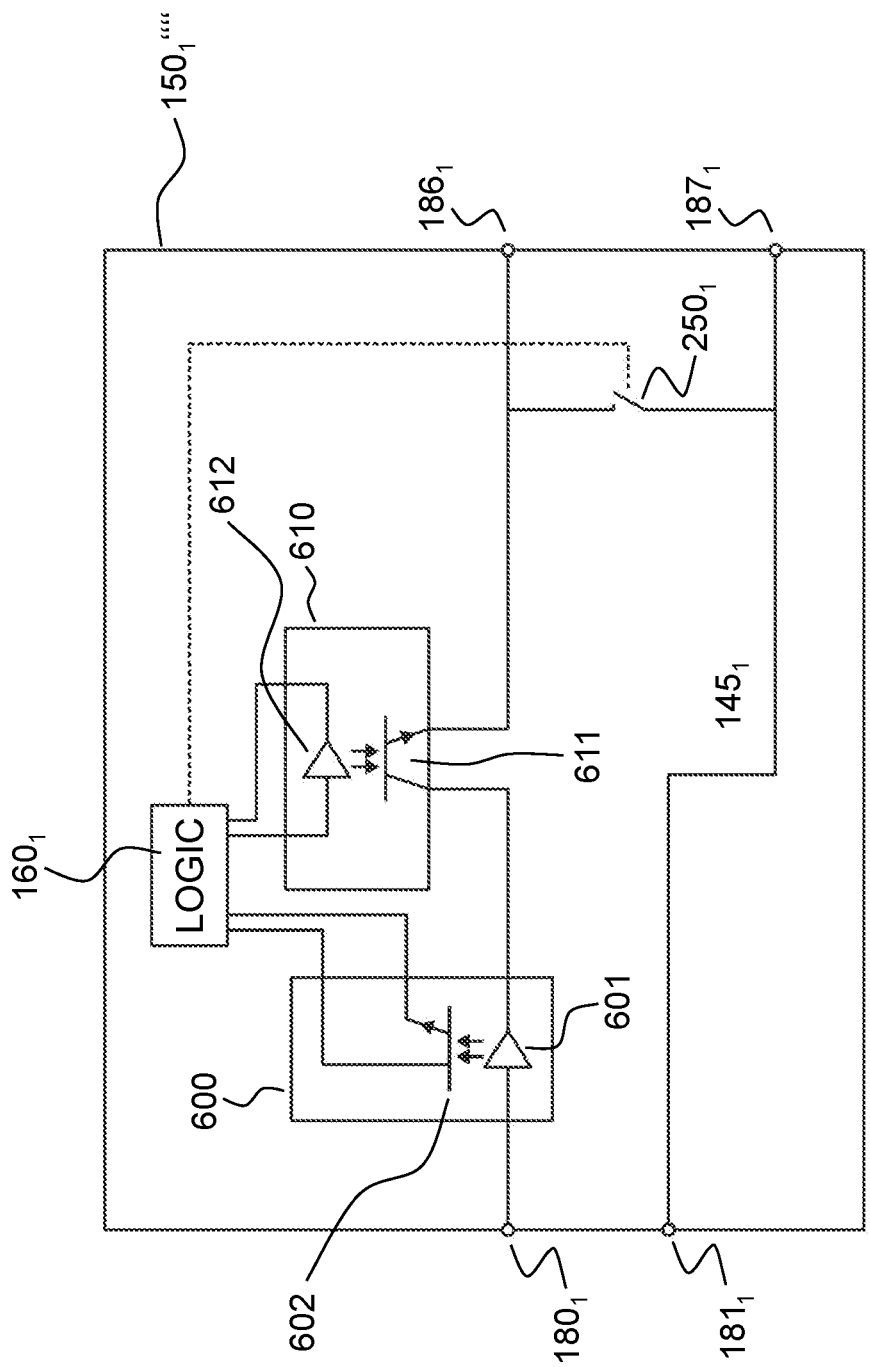
FIG. 9 shows a block diagram of an exemplary slave device including two optocouplers.

Furthermore, the master device 20 comprises a current detection means 120 connected into the current loop 140, which is connected to the evaluation and control unit 60. The evaluation and control unit 60 is configured to evaluate the current $I_m$ as measured by the current detection means 120. Evaluation and control unit 60 may furthermore be configured, for example, to cause execution of a defined action in response to the evaluation result. The current detection means 120 may be implemented by a resistor 121 connected into the current loop and a differential amplifier 122 connected to the resistor 121. The output of differential amplifier 122 is connected to an input of the evaluation and control unit 60. The differential amplifier 122 measures the voltage drop across measuring resistor 121, in a manner known per se, the voltage drop being proportional to the current flowing through the current loop 140. Alternatively, an optocoupler may be used as a current detection means 120, as shown in FIG. 9 in conjunction with a slave device $150_1$'''', as a block 600 by way of example.

Master device 20 may have at least one output that can be controlled by the first evaluation and control unit 60 and is represented in FIG. 1 by output terminals 71 and 72. The output may be implemented by a switching means actuable by evaluation and control unit 60, in particular a relay, which is symbolized in FIG. 1 by a switch 80 and an excitation coil 81.

Excitation coil 81 may be powered by a power source that is connected, for example, to connection terminals 230 and 231. An actuator (not shown) can be connected to output terminals 71 and 72. The actuator may be a machine, a machine part such as a robot of an automation system, which has to be switched off safely upon request or in the event of a fault.

Furthermore, the master 20 may include a voltage meter 240 that is connected to the input of current loop 140, i.e. to connection point 132, and to ground port 131. The output of voltage meter 240 is connected to the evaluation and control unit 60. In this case, the evaluation and control unit 60 is furthermore configured to evaluate the voltage $U_m$ as measured by the voltage meter 240, and preferably to cause execution of a defined action in response to the evaluation result. In this way, the master 20 is able, for example, to detect a cross-circuit in the current loop 140 and, optionally, to cause the entire communication system 10 to be shut down.

The configuration of slave devices $150_1$ and $150_n$ shown in FIG. 1 will now be explained in more detail, while assuming that the slave devices shown may have a substantially similar configuration. Also, slave devices $150_1$ and $150_n$ may perform similar functions. This is indicated by using the same reference numerals which differ only in the index. Accordingly, the configuration shall only be described with respect to slave device $150_1$.

The slave device $150_1$ has a pair of connection ports $180_1$ and $181_1$, to which the conductor sections 141 and 142 of current loop 140 can be connected. In this way, the slave device $150_1$ is connected to connection ports 130 and 131 of master device 20. Via a pair of connection ports $186_1$ and $187_1$, the slave device $150_1$ is connected to conductor sections 143 and 144 of the current loop 140 and so to the two corresponding connection ports $180_n$ and $181_n$ of slave device $150_n$. Connection ports $180_1$ and $181_1$ are internally connected via a conductor section $145_1$, which may be considered as a part of current loop 140. It should be noted that the conductor section 142 and the conductor section $145_1$ of slave device $150_1$ form parts of the return path of the current loop 140.

Furthermore, slave device $150_1$ comprises an evaluation and control unit $160_1$, which may also be referred to as a second evaluation and control unit $160_1$. Evaluation and control unit $160_1$ may be implemented by a microcontroller as well.

Optionally, slave device $150_1$ may comprise a voltage modulator $190_1$ connected to the current loop 140 and configured to modulate the total resistance of the current loop 140 in response to a control signal provided by the second evaluation and control unit $160_1$, in order to transmit data to the slave device $150_n$ and/or to the master device 20 via current loop 140. Voltage modulator $190_1$ may be implemented by an electrical resistance controlled by the evaluation and control unit $160_1$, or by a controllable impedance. The change in the total resistance of current loop 140 and the associated voltage change at the input of current loop 140 can be measured by voltage meter 240 and evaluated by the evaluation and control unit 60 of the master 20. Depending on the implementation, the evaluation and control unit 60 may then cause execution of a defined action in response to the evaluation result.

Slave device $150_1$ furthermore includes a current detection means $170_1$ connected into the current loop 140, which is connected to the second evaluation and control unit $160_1$. Current detection means $170_1$ may comprise a measuring resistor $172_1$ connected into the current loop 140, and the voltage drop across measuring resistor $172_1$ is picked off by a differential amplifier $171_1$. The output of differential amplifier $171_1$ is connected to the evaluation and control unit $160_1$.

The evaluation and control unit $160_1$ of the slave device $150_1$ is configured to evaluate the current $I_m$ measured by current detection means $170_1$. Depending on the implementation, the evaluation and control unit $160_1$ may cause execution of a defined action in response to the evaluation result.

Alternatively, the current detection means $170_1$ may be implemented by an optocoupler 600 as shown in FIG. 9. Optocoupler 600 includes an optical transmitter 601, for example an LED diode, which is connected between the ports $180_1$ and $186_1$ of slave device $150_1$. A phototransistor may be used as an optical receiver 602. Phototransistor 602 supplies a current to the evaluation and control unit $160_1$, which is dependent on the current in the current loop 140.

In order to be able to transmit information such as, for example, the address of slave device $150_1$, a status change request signal (shutdown command), or state information, to the slave device 150 and/or to the master 20 in a current-modulated manner, the slave device $150_1$ includes a switching means $200_1$, also referred to as a second switching means, which is connected into the current loop 140 and which can be opened and closed in response to a control signal from the evaluation and control unit $160_1$. In this way, the current loop 140 can be selectively interrupted by the slave device $150_1$. The duration of an interruption of the current loop 140 may depend on the information to be transmitted, which is known to the evaluation and control unit $160_1$. If the voltage modulator $190_1$ is provided, the switching means $200_1$ may be connected between voltage modulator $190_1$ and connection port $186_1$.

In order to be able, preferably, to automatically detect the configuration of the communication system 10, the slave device $150_1$ includes a further switching means $250_1$, also referred to as a third switching means, that is actuable by the evaluation and control unit $160_1$ and is configured to short-circuit the current loop 140 when in its closed state. For this purpose, the switching means $250_1$ may be connected directly between connection ports $186_1$ and $187_1$.

The evaluation and control unit $160_1$ is configured to temporarily close and then reopen the switching means $250_1$ during a system configuration detection phase. The duration during which the switching means $250_1$ is closed may be fixedly predefined or may be event-controlled, for example. The system configuration detection phase may also be considered as a slave connect mode, a slave loop-in mode, or a teaching mode, which is preferably initiated by the evaluation and control unit 60 of the master 20. The operation of the system configuration detection phase will be explained in more detail further below.

The evaluation and control unit 60 of the master 20 is configured to detect connection of the slave device $150_1$ and of each further slave device $150_n$ connected to the current loop 140. For example, the evaluation and control unit 60 detects connection of the slave $150_1$ from the opening of switching means $250_1$, whereby the total resistance of the current loop 140 is increased. The voltage change caused thereby at the input 131, 132 of current loop 140 is measured by voltage meter 240 and can be interpreted by the evaluation and control unit 60 as a connection of a slave.

Slave device $150_1$ may have at least one second output which is controllable by the second evaluation and control unit $160_1$ and is represented by output terminals $184_1$ and $185_1$. The controllable output is symbolized by a switch $210_1$, which is implemented as a relay, for example. Again, an actuator such as a robot, a machine, or the like may be connected to output ports $184_1$ and $185_1$.

Alternatively or additionally, the slave device $150_1$ may have at least one input which is symbolized by an input port 183. At the input, a sensor may be connected, for example a position switch, a light grid, and the like, which are capable of monitoring a process. A slave implemented like that is effective as an I/O subscriber of the communication system 10.

It should be noted that the current loop 140 is terminated by a termination means 270, preferably an electrical resistor of defined size. If the slave device $150_n$ is the last subscriber in the current loop 140, as shown in FIG. 1, then the termination means 270 is directly connected between the connection ports $186_n$ and $187_n$ of the slave device $150_n$. In this case, the return path of the current loop 140 moreover includes the conductor section $145_n$ extending between connection ports $181_n$ and $187_n$.

In order for the communication system as shown in FIG. 1 to be usable in a safety-oriented application, it is favorable for the master device 20 and at least some of the slave devices to be configured as safety-oriented subscribers. Some exemplary embodiments thereof will be explained below.

Figure 2:
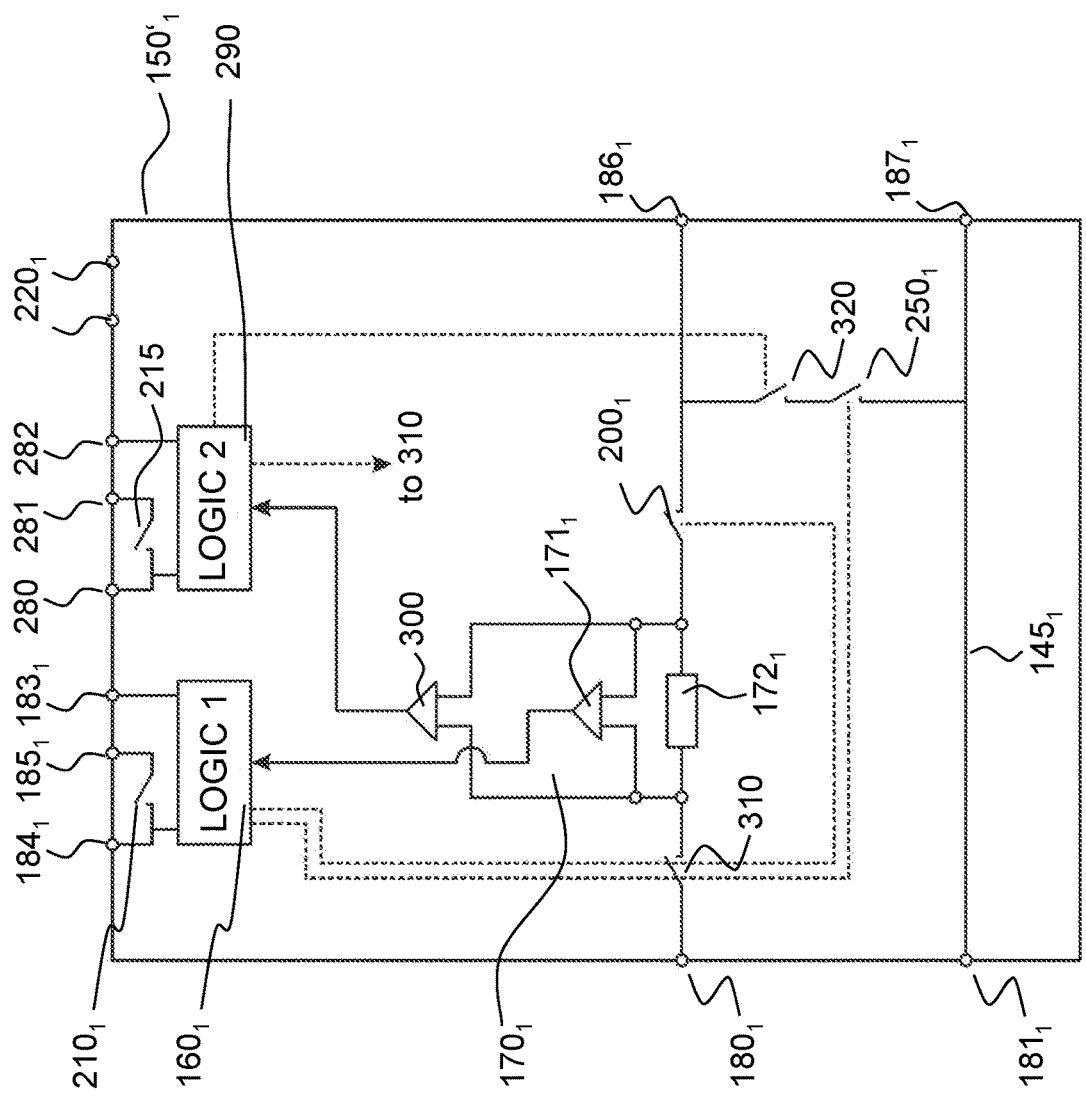
FIG. 2 shows a block diagram of an exemplary redundantly configured slave device.

FIG. 2 shows a first example of a redundantly configured slave device $150_1'$.

With the exception of voltage modulator $190_1$ which is only optional, it contains all the components of slave device $150_1$.

Furthermore, the slave device $150_1'$ has a further evaluation and control unit 290, also referred to as LOGIC 2. Slave device $150_1'$ may have a second output 280, 281 which is controllable by the evaluation and control unit 290. This is symbolized in terms of circuitry by a switching means 215 between the two output ports 280 and 281. Switching means 215 may be implemented as a relay, similar to switching means $210_1$. It should be noted already at this point that an actuator, for example a machine part, can be connected to the first output 184, 185 and to the second output 280 and 281. Only when both switching means $210_1$ and 215 are closed, the machine part is ready for operation. When one of the two switching means $210_1$ and 215 is opened, the machine part is switched off. A further input 282 may be provided, which is connected to the evaluation and control unit 290. As at input $183_1$, a sensor can also be connected to the second input 282, for example an emergency stop switch.

The redundantly configured slave device $150_1'$ furthermore includes a second current detection means 300 which, for example, comprises a differential amplifier connected to the measuring resistor $172_1$. The output of the differential amplifier of the second current detection means 300 is connected to the second evaluation and control unit 290.

In the forward path of current loop 140, which extends between connection ports $180_1$ and $186_1$, a further switching means 310 is provided, which is controlled by the second evaluation and control unit 290. For example, the further switching means 310 is looped into the current loop between connection port $180_1$ and measuring resistor $172_1$. Switching means 310 is opened and closed by the evaluation and control unit 290 in order to transmit current-modulated data.

A further switching means 320 is connected in series with switching means $250_1$, for short-circuiting the current loop 140, in particular during a system configuration detection phase. Switching means 320 is controlled by the second evaluation and control unit 290. Only when the two switching means $250_1$ and 320 are closed, the current loop 140 will be short-circuited with respect to the slave device $150_1'$. It should be noted that the switching means $250_1$ and 320 may be connected in parallel as well. Furthermore, one of the two switching means may be omitted.

Figure 3:
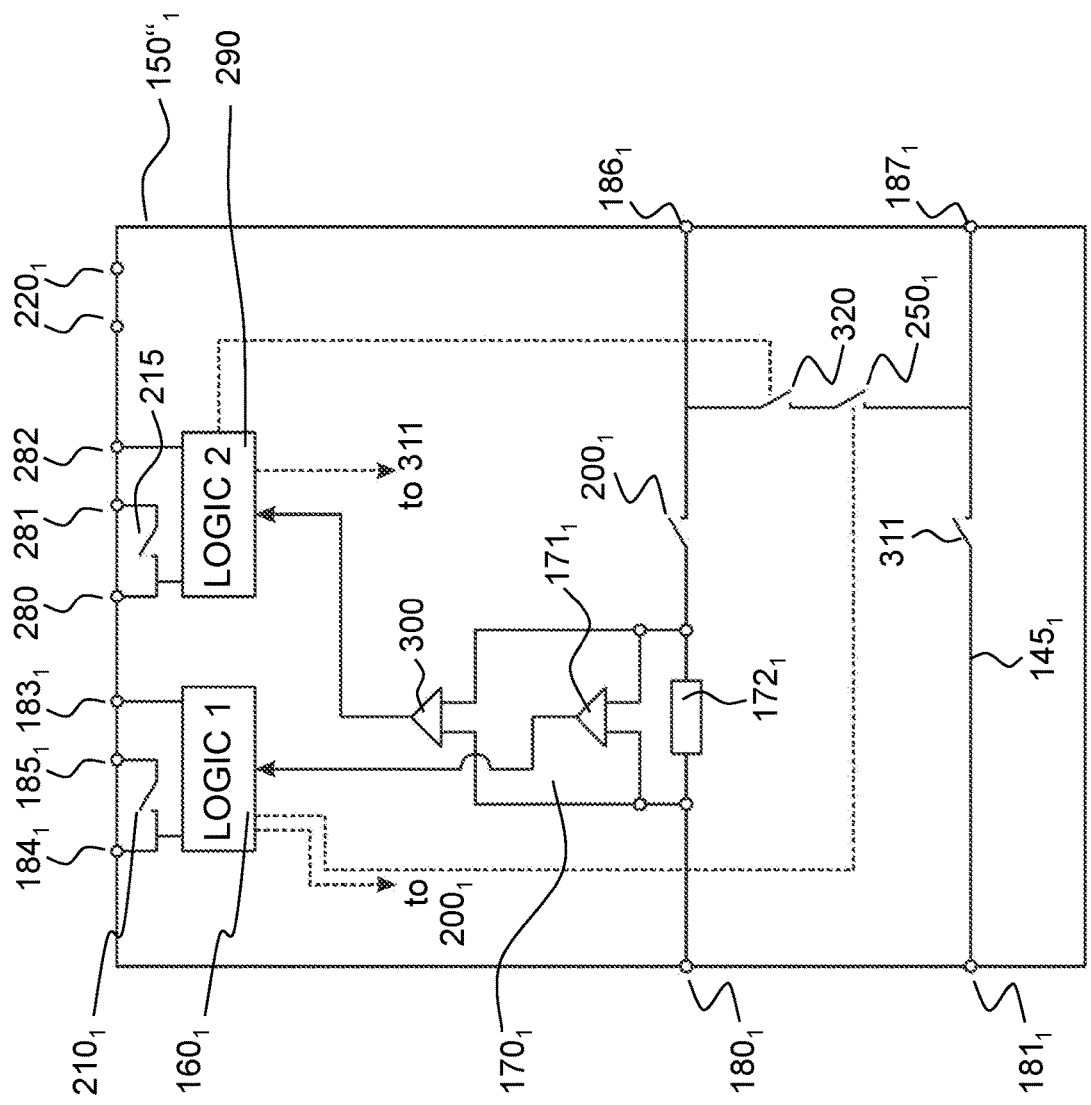
FIG. 3 shows a block diagram of another exemplary redundantly configured slave device.

FIG. 3 shows a further example of a redundantly configured slave device $150_1''$. It differs from the redundant slave device $150_1'$ of FIG. 2 only in that the switching means 310 is not looped into the forward path of the current loop 140, but rather is looped into the return path $145_1$, as a switching means 311.

Figure 4:
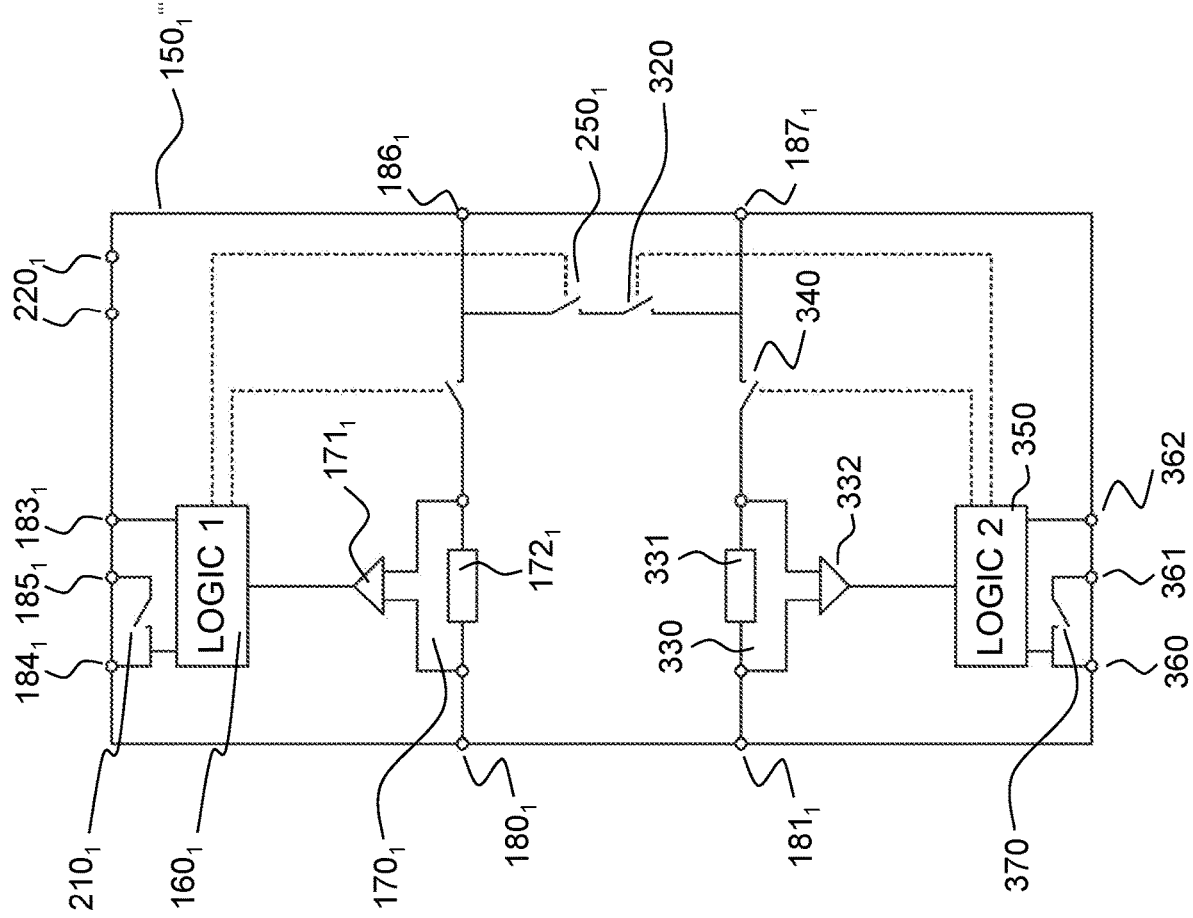
FIG. 4 shows a block diagram of another exemplary redundantly configured slave device.

FIG. 4 shows a further example of a redundantly configured slave device $150_1'''$. It again comprises the components of slave device $150_1$.

The essential difference between slave devices $150_1'$ and $150_1''$ and the slave device shown in FIG. 4 is that a further current detection means 330 is not looped into the forward path but rather into the return path of the current loop 140.

The redundant current detection means 330 may again comprise a measuring resistor 331 and a differential amplifier 332 which has its output connected to a redundant evaluation and control unit 350. The measuring resistor 331 is connected into the forward path of current loop 140 between connection ports $181_1$ and $187_1$.

A further switching means 340 is connected between measuring resistor 331 and connection port $187_1$. Switching means 340 is provided redundantly to switching means 201 and serves for the same purpose, namely to transmit data in a current-modulated manner via the current loop, for example. Switch 340 is controlled by the evaluation and control unit 350. Evaluation and control unit 350 also controls a switching means 320 which is connected in series with switching means $250_1$.

Similar to the variants previously shown in FIGS. 2 and 3, the slave device $150_1'''$ has a further output 360, 361 which is controllable by the evaluation and control unit 350. This is symbolized by a switching means 370 which again may be implemented as a relay. It should be noted that an actuator (not shown) is connected to both the first input $184_1$, $185_1$, and the second input 360, 361. A further input 362 may be provided, to which, again, a sensor may be connected. The further output 360, 361 and the further input 362 are connected to the evaluation and control unit 350.

Figure 5:
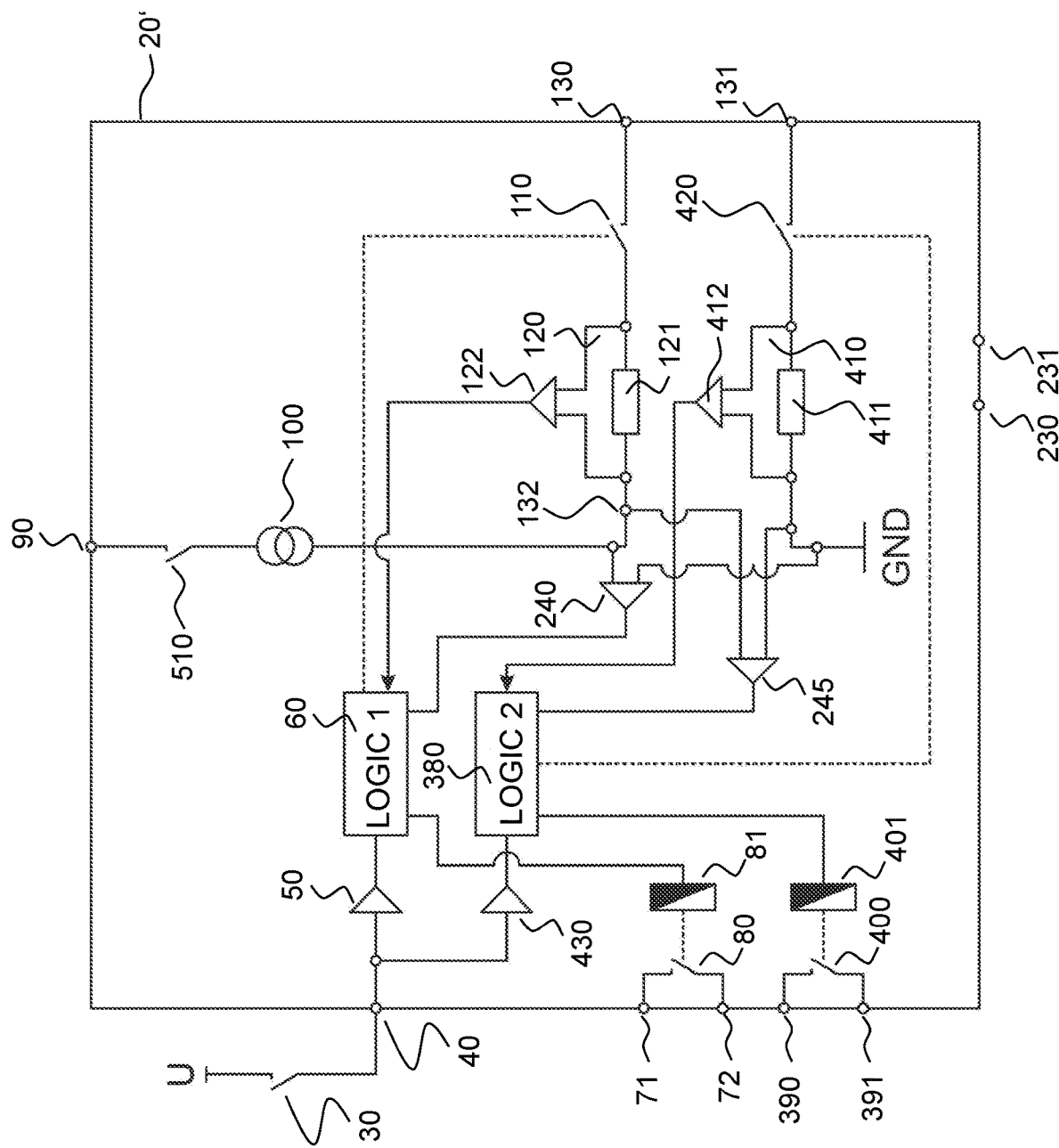
FIG. 5 shows a block diagram of an exemplary redundantly configured master device.

FIG. 5 shows an example of a redundantly configured master device 20' which comprises the components of the master device 20 shown in FIG. 1. Additionally, it comprises further components.

In particular, the master device 20' includes a redundant current detection means 410 and a redundant switching means 420, which are looped into the return path of current loop 140. Like current detection means 120, the current detection means 410 may comprise a measuring resistor 411 and a differential amplifier 412. The measuring resistor 411 is connected in series with the redundant switching means 420 between ground and connection port 131. The output of differential amplifier 412 is connected to a second evaluation and control unit 380. Similarly to the first logic 60, an input of the evaluation and control unit 380 may be connected, via a signal conditioning means 430, to the input 40 to which the emergency stop switch 30 is connected, by way of example. Switching means 420 can be actuated by the evaluation and control unit 380 in order to modulate data by modulating the quiescent current injected by the power source 100.

The master device 20' may have a further output 390, 391 which is internally connected to a relay, for example. The relay is shown schematically by a switching means 400 and a coil means 401, which may again be controlled by the redundant evaluation and control unit 380. A safety-related actuator may be connected to the first output 71, 72 and to the second output 390, 391. The actuator can only be operated if both outputs are closed, i.e. enabled. If one of the outputs is opened or disabled, the actuator is switched off.

Preferably, a second voltage meter 245 may be connected between the connection point 132 and ground. The output of voltage meter 245 is again connected to the redundant evaluation and control unit 380. Advantageously, the two evaluation and control units 60 and 380 are able to communicate with each other, for example in order to compare the measured voltages. If the voltages measured by voltage meters 240, 245 do not match, the master device 20' may, for example, cause the communication system to be shut down.

Figure 6:
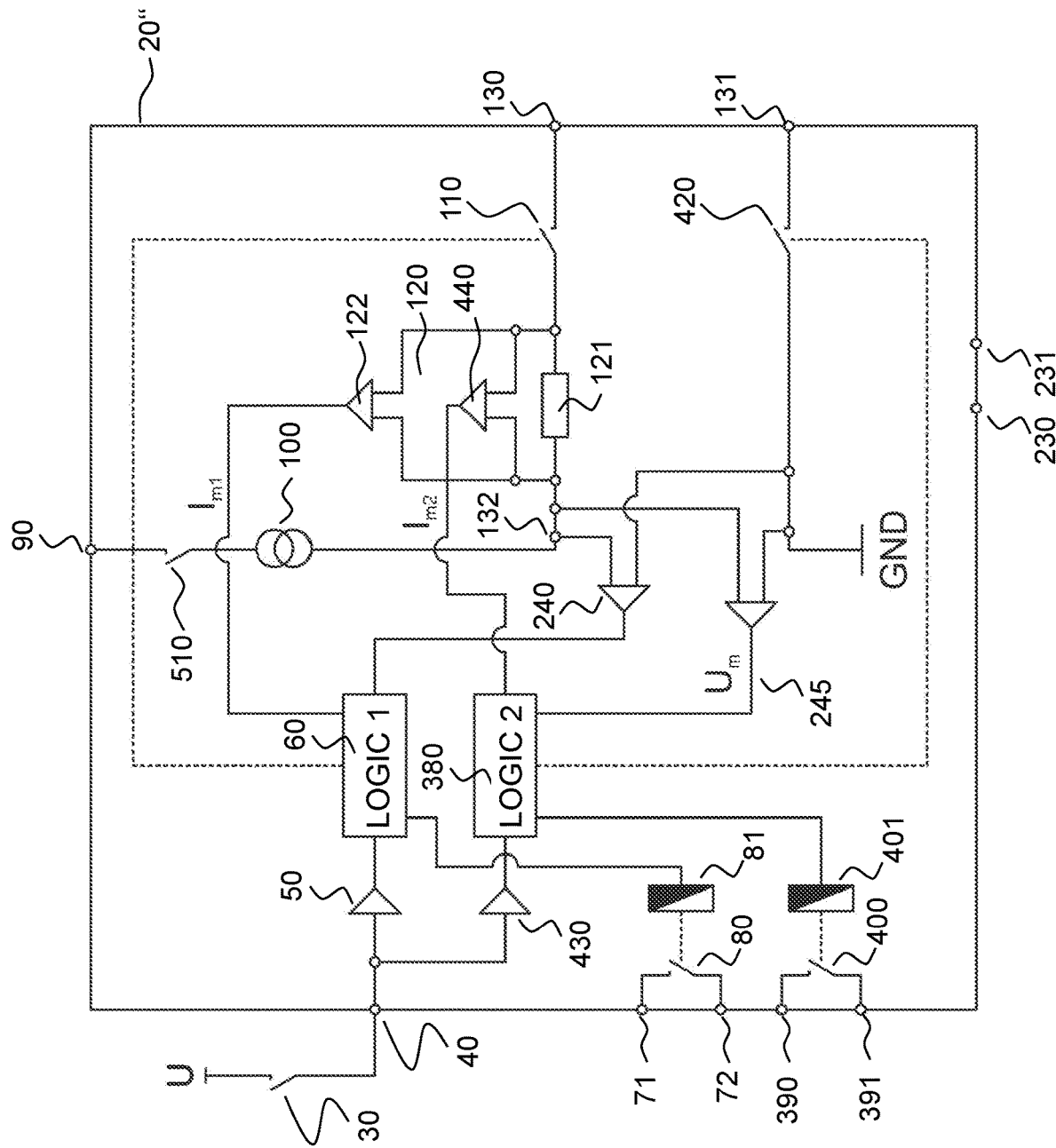
FIG. 6 shows a block diagram of another exemplary redundantly configured master device.

FIG. 6 shows a further example of a redundantly configured master device 20" which differs from the master device 20' shown in FIG. 5 by having a redundant current detection means 440 looped into the forward path of the current loop 140, like the first current detection means 120.

The redundant current detection means 440 comprises a differential amplifier which may be connected to the already existing measuring resistor 121. The output signal of the differential amplifier of redundant current detection means 440 is supplied to the second evaluation and control unit 380.

It should be noted at this point, that the redundant current detection means 410 and 440 as shown in FIGS. 5 and 6, respectively, may also be provided in the form of an optocoupler.

FIG. 9 shows the exemplary slave device $150_1''''$ already mentioned above, which differs from the slave device $150_1$ shown in FIG. 1 in that the switching means $200_1$ looped into the forward path is replaced by an optocoupler 610, and the current detection means $170_1$ shown in FIG. 1 is replaced by an optocoupler 600.

The optocoupler 610 functioning as a switching means includes an optical transmitter in the form of an LED diode 612, for example, which is connected to the output of evaluation and control unit $160_1$. A phototransistor 611 which has its emitter-collector path connected into the forward path of the current loop 140, may be used as an optical receiver.

The operation of the exemplary communication system 10 shown in FIG. 1 will now be explained in more detail.

Assuming, initially, that the communication system 10 operates properly, i.e. switch 30, switch 510, switching means 110 of master device 20, and switching means $200_1$ and $200_n$ of the two slave devices $150_1$ and $150_n$ are closed, while switching means $250_1$ and $250_n$ are open. Consequently, the current source 100 shown in detail in FIG. 7 injects a constant quiescent current into the closed current loop 140. Thus, the current detection means 120, $170_1$, and $170_n$ will all measure the same quiescent current, which is interpreted as a proper operation by the respective evaluation and control units 60, $160_1$, and $160_n$. During operation, data may be exchanged between the master 20 and the slaves $150_1$ and $150_n$ by opening and then closing again the switching means 110, by the master 20, the switching means $200_1$ by slave device $150_1$, or the switching means $200_n$, by slave device $150_n$, on the basis of an implemented communication protocol. In this way, current pulses of defined length can be introduced into the constant quiescent current. The current detection means 120, $170_1$, and $170_n$ are each configured to capture such a modulated quiescent current. Evaluation of the modulated quiescent current then takes place in the evaluation and control units 60, $160_1$, and $160_n$. In this way, it is possible to exchange for example addresses, process data, configuration data, control commands, and the like, between the subscribers.

Assuming now, that the emergency stop switch connected to the input $183_1$ of slave device $150_1$ has been actuated by an operator. The evaluation and control unit $160_1$ of slave device $150_1$ will interpret the actuation of the emergency stop switch $183_1$ as a critical state, whereupon the evaluation and control unit $160_1$ causes the switching means $200_1$ to interrupt the current loop 140 for a defined time duration, for generating a state change request signal. The state change request signal signals, for example, that a safe state has been requested, for example the shut-down of particular actuators. Depending on the implementation, the evaluation and control unit $160_1$ may be responsive to the actuation of the emergency stop switch by transferring the output $184_1$, $185_1$ into a safe state by opening the switch $210_1$, immediately or for example upon request by the master 20. In this way, an actuator connected to the output can be shut down.

It should be noted at this point that the evaluation and control unit 60 of the master 20 can drive the switching means 110 in order to generate a state change request signal. The evaluation and control unit $160_n$ may also be configured to correspondingly drive the switching means $200_n$ of the slave $150_n$ to generate a state change request signal.

The interruption of current loop 140 by the opening of switching means $200_1$ also interrupts the current flow through the current loop, i.e. a current pulse of defined length is cut out of the constant quiescent current, so to speak. This "negative" current pulse of defined length is detected by the current detection means $171_n$ of slave device $150_n$ and by the current detection means 120 of the master 20 and is interpreted as a state change request signal by the corresponding evaluation and control unit 60 and $160_n$, respectively. In response to the detected state change request signal, the evaluation and control unit 60 of the master 20 causes the output 71, 72 to be transferred into a safe state. This is achieved, for example, by opening the relay 80, 81. Similarly, the evaluation and control unit $160_n$ causes the output $184_1$, $185_1$ of the slave $150_n$ to be transferred into a safe state, for example by opening the switching means $210_n$. If the outputs are implemented as semiconductor outputs, then a safe state means that the semiconductor outputs are set to a low state.

Depending on the implementation, the evaluation and control units 60, $160_1$, and $160_n$ may open the switching means 110, switching means $200_1$, and switching means $200_n$, once they have detected a state change request signal. The slave devices may additionally close the switching means $250_1$ and $250_n$, respectively. In this way, the communication system 10 can be reliably maintained in the safe state. In other words, it will be locked. So, an unintentional reset into the operating state is prevented. Advantageously, a loop-in mode which is also referred to as a system configuration detection phase could now be initiated by the master device 20, which may in particular be used to find out which subscriber has generated a state change request signal.

Also conceivable is a scenario in which, once the communication system 10 is in the safe state, i.e. the output 71, 72 of the master 20 and the outputs of the slave devices $150_1$ and $150_n$ are each in the safe state, the switching means $250_1$ and $250_n$ are not closed at first, and the open switching means 110, $200_1$ and $200_n$ are closed again after a defined period of time. In this way it is achieved that data can be transmitted between the subscribers through current modulation of the quiescent current, even if the communication system 10 is kept in the safe state. However, this means that it has to be ensured that, as long as the communication system 10 is in the safe state, no current pulses must be cut out of the quiescent current, which otherwise would be interpreted, by the evaluation and control units 60, $160_1$, and $160_n$, as a command for resetting the respective outputs. In order to initiate a loop-in mode in this case, the evaluation and control unit 60 of the master 20 could open the switching means for a defined period of time, so that the quiescent current is interrupted for this defined period of time. This "negative" current pulse, i.e. no quiescent current flows, can be interpreted as a request to perform a loop-in phase by the evaluation and control units $160_1$ and $160_n$. In response to this negative current pulse of defined length, the evaluation and control units $160_1$ and $160_n$ cause the switching means $250_1$ and $250_n$ and the switching means $200_1$ and $200_n$ to be closed. Switching means 110 of the master 20 is closed as well. This state leads to a change in the total resistance of the current loop 140, which can be detected by the voltage meter 240 of the master 20 due to an associated voltage change at the inputs 131, 132 of the current loop 140, and can be evaluated by the evaluation and control unit 60. The communication system 10 is now in the loop-in mode, which will be explained below.

The evaluation and control unit 60 of the master 20 now drives the switching means 110 to generate a first current-modulated signal, by opening it, for example once for a defined time, and then reclosing it. The first current-modulated signal may, but need not, address the slave device $150_1$ immediately downstream of the master 20 in the chain. However, since switching means $250_1$ is closed, the first current-modulated signal is only detected by the current detection means $170_1$ of slave device $150_1$ and is interpreted, by the evaluation and control unit $160_1$ of the slave device $150_1$, as a corresponding loop-in signal.

The evaluation and control unit $160_1$ of slave device $150_1$ may be configured to open the switching means $200_1$ for a defined period of time, or to open and close it in a defined rhythm, in order to generate specific response information. The response information may include the address of the slave device $150_1$ and information about that the slave device $150_1$ has previously generated the state change request signal. Such response information is detected by the current detection means 120 of the master 20 and is accordingly evaluated by the evaluation and control unit 60. The evaluation and control unit $160_1$ of the slave $150_1$ may be configured to reopen the switching means $250_1$ immediately after having transmitted the response information. Alternatively, it would be conceivable that the evaluation and control unit $160_1$ of the slave $150_1$ is configured to first open the switching means $250_1$ and then to transmit the response information as a current-modulated signal. In this case, however, the response information of the slave $150_1$ would also be passed through the downstream slave device $150_n$. In this case, the evaluation and control unit $160_n$ of the slave $150_n$ may be configured to detect that this response information is not intended for itself but for the master 20.

As soon as the master 20 has received and evaluated the response information from the slave device $150_1$, it knows that the slave device $150_1$ has been looped back into the current loop 140 and has requested the system state change.

Once the evaluation and control unit 60 has received and evaluated the response information of slave device $150_1$, it generates a second current-modulated signal by means of the switching means 110, which may be equal to the first current-modulated signal. Alternatively, however, the second current-modulated signal may contain the address of the further slave device $150_n$, if the latter is known to the master 20, or may just have a different duration than the first current signal. Once the slave device $150_n$ has received and evaluated the second current-modulated signal, the evaluation and control unit $160_n$ can generate response information which includes the address of the slave device $150_n$, for example, by driving the switching means $200_n$. After or prior to the transmitting of the response information, the evaluation and control unit $160_n$ may reopen the switching means $250_n$. From the response information of the slave device $150_n$, the master device 20 will recognize that now the second slave device $150_n$ has again been looped into the current loop 140.

This procedure is repeated until all slave devices have transmitted a response signal to the master 20 and thus have been looped into the current loop.

It should be noted at this point, that the master 20 can also detect the looping-in of a slave device from a voltage change at the input 131, 132 of the current loop, through the voltage meter 240, since the total resistance of the current loop 140 changes with each looping-in of a slave device.

When all slave devices have been looped in and the communication system 10 is ready for operation again, the evaluation and control unit 60 can inject a so-called release signal into the current loop 140, by actuating the switching means 110. The release signal is received by all slave devices $150_1$ and $150_n$, since now the switching means $200_1$ and $200_n$ are closed and the switching means $250_1$ and $250_n$ are open again.

It should be noted at this point, that an operator may signal the proper operation of the communication system 10 to the master device 20 which then generates the corresponding release signal. In response to the release signal, the evaluation and control unit $160_1$ causes the switching means $210_1$ to be reopened, while the evaluation and control unit $160_n$ causes the switching means $210_n$ and thus the output $184_n$, $185_n$ of the slave device $150_n$ to be reopened or switched on again. In the case of semiconductor outputs, such outputs would be set to the high level.

Now, assuming the case that the communication system shown in FIG. 1 is to be put into operation for the first time. For this purpose, all switching means are closed, i.e. switching means 110, $200_1$, $200_n$, $250_1$, and $250_n$.

In order to be able to automatically detect the configuration, a system configuration detection phase, also known as a teaching mode, is initiated by the master 20. Unless information, such as addresses, is transferred to the master from the slave devices $150_1$ and $150_n$ during the teaching process, switches $200_1$ and $200_n$ remain closed throughout the system configuration detection phase.

First, the evaluation and control unit 60 of the master 20 generates a first current pulse of defined length, for example by opening the switch 110 for a defined period of time. This first current pulse corresponding to a quiescent current of 0 A can only be seen by the slave device $150_1$, since switches $250_1$ and $250_n$ are closed. The evaluation and control unit $160_1$ interprets the first current pulse and concludes that a system configuration detection phase has been initiated.

In order to signal to the master 20 that the slave device $150_1$ is looped into the current loop 140, the evaluation and control unit $160_1$ causes the switching means $250_1$ to be opened. As a result, the total resistance of the current loop changes, since the quiescent current now also flows through the slave device $150_n$. An associated voltage change can be detected at the input 131, 132 of the current loop 140 by the voltage meter 240 of master 20, and can be interpreted by the evaluation and control unit 60 as the looping-in of slave device $150_1$.

If, for example, the master 20 does not include a voltage meter 240, the slave device $150_1$ may signal to the master 20 to be looped in by opening the switching means $200_1$ of the slave device $150_1$ for a defined period of time, for example.

Alternatively, the slave device $150_1$ may transmit response information which optionally may also include the address of the slave device $150_1$ to the master 20 by correspondingly open and close the switching means $200_1$. The correspondingly modulated quiescent current is received by the master device 20 via current detection means 120 and is evaluated accordingly by the evaluation and control unit 60.

Once the master device 20 has detected the looping-in of slave device $150_1$, it generates a further current pulse in the current loop 140, by again driving the switching means 110. This current pulse, if it is identical to the first current pulse, can be identified by the slave device $150_1$ as a confirmation, and by the slave device $150_n$ as the start of the system configuration detection phase. In this way, the slave device $150_1$ can recognize that it has been properly detected by the master 20. In addition, it may also control its position within the current loop 140 in this way, since the number of received current pulses corresponds to the number of slave devices downstream of slave device $150_1$ in the chain.

In response to the further current pulse, the evaluation and control unit $160_n$ causes the switching means $250_n$ to be opened. As a result, the defined terminating resistor 270 is looped into the current loop 140, which changes the total resistance of the current loop 140 and leads to a sudden voltage change at the input of current loop 140 in the master 20. Again, the master 20 identifies this voltage change as the looping-in of a further slave $150_n$. If, for example, the master 20 does not have a voltage meter 240, the slave device $150_n$ may signal to the master 20 to be looped in by opening the switching means $200_n$ for a defined period of time, for example. Alternatively, the slave device $150_n$ may transmit response information which optionally may also include the address of the slave device $150_n$ to the master 20 by correspondingly open and close the switching means $200_n$. The correspondingly modulated quiescent current is received by the master device 20 via current detection means 120 and is evaluated accordingly by the evaluation and control unit 60.

If more than two slave devices are connected to the current loop 140, the procedure described above is repeated until all slaves have been detected. The master 20 can recognize the end of the system configuration detection phase for example by the fact that no voltage change has been detected at the input of the current loop 140 or no response signal has been received from another slave device in response to the last "negative" current pulse generated by the master 20.

Once the system configuration and detection phase has been completed, and if successful, it may be acknowledged to the master 20 by an operator. After a successful system configuration detection phase, the master 20 will know the number of connected slaves and optionally their addresses.

The above-described loop-in method and the above-described system configuration detection phase may be performed each time particular status information is to be queried from the slave devices, for example information about that a slave device has requested a state change.

Now, referring again to the exemplary circuit arrangement of the power source 100 illustrated in FIG. 7.

As already mentioned, the circuit arrangement according to FIG. 7 allows the current source 100 to remain switched on, even if the current loop 140 is opened for a short time or longer. The operation of the current source is explained in more detail in conjunction with FIGS. 8a to 8d.

FIG. 8c shows successive operating states of the communication system 10 in the form of logic state changes as caused by the switching means 110, $200_1$, and $200_n$ looped into the current loop. A high level indicates that the current loop 140 is closed, a low level indicates that the current loop is interrupted. The first three pulse pairs represent the system configuration detection phase or teaching phase, followed by a slightly longer high level which signals the end of the teaching phase. The subsequent long high level signals an operating mode in fault-free operation. The subsequent long low level indicates that the communication system 10 is in the safe state, i.e. the current loop 140 is interrupted.

FIG. 8b shows the output current $I_{out}$ flowing through the current loop 140 as a quiescent current when the current loop 140 is interrupted and closed according to the logic switching state shown in FIG. 8c. The output current $I_{out}$ is limited to a maximum value.

As can be seen in FIG. 8d, the output voltage $U_{out}$ applied between connection point 132 and ground connection 131 increases with each opening of the current loop 140. As soon as the output voltage has reached a threshold value, the circuit arrangement shown in FIG. 7 causes the regulated current $I_{reg}$ to be abruptly lowered to an adjustable value. In this way, the power consumption in the master 20 can be reduced when the current loop is interrupted. The time profile of the regulated current corresponding to the current through series resistor 545 is shown in FIG. 8a.

In other words, the circuit arrangement shown in FIG. 7 regulates the regulated current flowing through series resistor 545 as a function of the voltage applied at the input 131, 132 of the current loop 140 such that power consumption in the master can be reduced while the current loop is open.

The aspects of the invention will be summarized below in conjunction with the drawings.

A communication system 10 is provided for current-modulated data transmission between a master device and at least one slave device. As shown in FIG. 1 by way of example, the communication system 10 has the following features:
a) a current loop 140 which is configured for data transmission and optionally for power supply;
b) a master device 20 comprising:
   a first evaluation and control unit 60;
   a first switching means 110 which is connected into the current loop 140 and is actuable by the first evaluation and control unit 60, and which is configured to open and close the current loop 140 for transmitting data;
   an electrical current source 100 connected into the current loop 140 and configured to inject a constant quiescent current into the current loop 140, in particular during fault-free operation;
   a first current detection means 120 connected into the current loop 140, which is connected to the first evaluation and control unit 60, the first evaluation and control unit 60 being configured to evaluate the current detected by the first current detection means 120, wherein the first evaluation and control unit 60 may furthermore be configured to cause execution of a defined action, for example in response to the evaluation result;
c) at least one slave device $150_1$, $150_n$ connected to the current loop 140 and comprising the following features:
   a second evaluation and control unit $160_1$, $160_n$;
   a second switching means $200_1$, $200_n$ connected into the current loop 140 and actuable by the second evaluation and control unit $160_1$, $160_n$, which is configured to open and close the current loop 140 for transmitting data;

a third switching means $250_1$, $250_n$ actuable by the second evaluation and control unit $160_1$, $160_n$, which is configured to short-circuit the current loop 140 when in its closed state; wherein
the second evaluation and control unit $160_1$, $160_n$ is configured to temporarily close and then reopen the third switching means $250_1$, $250_n$ during a system configuration detection phase that may also be referred to as a slave connect phase or slave loop-in phase, and wherein the first evaluation and control unit 60 is configured to detect when the at least one slave device $150_1$, $150_n$ is connected into the current loop 140 or the at least one slave device $150_1$, $150_n$ is looped into the current loop 140, for example by detecting and evaluating, by the master device 20, the total resistance of the current loop 140, which changes when the third switching means is opened;

a second current detection means $170_1$, $170_n$ connected into the current loop 140, which is connected to the second evaluation and control unit $160_1$, $160_n$, the second evaluation and control unit $160_1$, $160_n$ being configured to evaluate the current detected by the second current detection means $170_1$, $170_n$. For example, the second evaluation and control unit $160_1$, $160_n$ may be configured to cause execution of a defined action, for example in response to the evaluation result.

A defined action can be understood to mean, for example, a transfer of information, such as the transfer of addresses, status information or control commands from the master device to the at least one slave device or from the at least one slave device to the master device, the disabling of outputs, or the partial or complete shutdown of the communication system.

The current loop 140 functions in particular as a communication interface between the master device 20 and the at least one slave device $150_1$, $150_n$. In this way, each subscriber can respond to state changes in the communication system 10 within a short time. Thanks to the use of a current loop and the evaluation of a current level, voltage swings caused by EMC effects will not disturb the functionality of the communication system 10. Consequently, sufficient robustness of the system can be achieved.

In order to be able to detect voltage changes at the input 131, 132 of the current loop 140, the master device 20 may comprise a voltage meter 240 connected to the first evaluation and control unit 60, which can be connected to the input of the current loop 140. The first evaluation and control unit 60 is configured to evaluate the voltages measured by the voltage meter 240. Furthermore, it may be configured to optionally execute or trigger a defined action in response to the evaluation result. Voltage changes at the input 131, 132 of current loop 140 will occur, for example, when the third switching means $250_1$, $250_n$ of the at least one slave device $150_1$, $150_n$ is closed and reopened, or when the current loop 140 is interrupted, for whatever reason.

Numerous embodiments with regard to the current detection means are conceivable. Preferably, the first current detection means 120 of the master device 20 and the second current detection means $170_1$, $170_n$ of the at least one slave device $150_1$, $150_n$ each comprise
i) an optocoupler; or
ii) a measuring resistor 121; $172_1$, $172_n$ and a differential amplifier 122; $171_1$, $171_n$ connected to the first and second evaluation and control unit 60; $160_1$, $160_n$, respectively.

For example, the master device 20 may have at least one first input 40 to which a sensor 30 can be connected. The sensor may be an emergency stop switch. Alternatively or additionally, the at least one slave device $150_1$, $150_n$ may also have at least one second input $183_1$, $183_n$ that is connected to the second evaluation and control unit $160_1$, $160_n$, and to which a sensor can be connected as well, for example a two-hand switch.

In order to be utilizable as I/O devices, the master device 20 may have at least one first output 70, 71 that is controllable by the first evaluation and control unit 60 and to which an actuator can be connected. Alternatively or optionally, the at least one slave device $150_1$, $150_n$ may have at least one second output $184_1$, $185_1$; $184_n$, $185_n$ that is controllable by the second evaluation and control unit $160_1$, $160_n$ and to which an actuator can be connected.

For example, in order to be able to transfer the communication system 10 into a safe state, the first evaluation and control unit 60 of the master device 20 may drive the first switching means 110 in a defined manner for generating a state change request signal. Preferably, for this purpose, the current loop 140 is opened by the first switching means 110 for a predetermined minimum duration. It is also conceivable for the current loop to remain open until the fault has been rectified.

Alternatively or additionally, the second evaluation and control unit $160_1$, $160_n$ may drive the second switching means $200_1$, $200_n$ of the at least one slave device in a defined manner for generating a state change request signal.

In order to be able to respond to a requested state change, the first evaluation and control unit 60 of the master device 20 may be configured to be responsive to a received state change request signal by transferring the first output or the actuator connected to the first output into a safe state. The second evaluation and control unit $160_1$, $160_n$ may be configured to be responsive to a received state change request signal by transferring the second output or the actuator connected to the second output into a safe state.

In order to achieve a safe state, the first evaluation and control unit 60 of the master device 20 may be configured to open the first switching means 110 in response to a received state change request signal. The second evaluation and control unit $160_1$, $160_n$ may be configured to open the second switching means $200_1$, $200_n$ in response to a received state change request signal.

Sometimes it is desirable to transfer data via the current loop 140, even though the outputs must remain in a safe state. Therefore, advantageously, the first evaluation and control unit 60 may be configured to keep the first output 70, 71 in the safe state and at the same time keep the current loop 140 closed for data transmission. Similarly, the second evaluation and control unit $160_1$, $160_n$ may be configured to keep the second output $184_1$, $185_1$; $184_n$, $185_n$ in the safe state and at the same time keep the current loop 140 closed for data transmission.

Favorably, the first evaluation and control unit 60 may be configured to close the first switching means 110 during a system configuration detection phase and to inject predetermined system information into the current loop 140. The system configuration detection phase may be automatically initiated by the master device 20 in response to a particular event, or by an operator. For this purpose, the second evaluation and control unit $160_1$, $160_n$ of the at least one slave device $150_1$, $150_n$ may be configured to close the second and third switching means $200_1$, $250_1$; $200_n$, $250_n$, during a system configuration detection phase, and to reopen the third switching means $250_1$, $250_n$ when the predetermined system information has been received.

Advantageously, the electrical current source 100 is configured to provide an electrical current of an adjustable power level.

An energy saving and reliably switchable electrical current source 100 preferably includes a switched-mode power supply 500 comprising a regulator and a step-down converter, with current-controlled voltage feedback 530 to the regulator.

Preferably, data that can be transferred between the master device 20 and the at least one slave device $150_1$, $150_n$, include control data, process data, parameterization data, diagnostic data, slave-based state data, which include an address, a state change request command, acknowledgment signals, and the like, for example, and safety-relevant data.

In order for the communication system 10 to be utilizable in a safety application, the master device 20 and the at least one slave device $150_1$, $150_n$ are preferably configured so as to be redundant. Examples of a redundantly configured slave device $150_1$ are shown in FIGS. 2 to 4, wherein the variants of a redundantly configured slave device $150_1$ are designated by reference numerals $150_1'$, $150_1''$, and $150_1'''$. Examples of a redundantly configured master device 20 are shown in FIGS. 5 and 6, wherein the variants of a redundantly configured master device 20 are designated by reference numerals 20' and 20", respectively. In particular, the master device 20', 20" has the following further features:

- a further first evaluation and control unit 380;
- a further first switching means 420 connected into the current loop 140 and actuable by the further first evaluation and control unit 380, which is configured to open and close the current loop 140;
- a further first current detection means, 410 or 440, connected into the current loop 140, which is connected to the further first evaluation and control unit 380, the further first evaluation and control unit 380 being configured to evaluate the current detected by the further first current detection means 410 or 440, and, for example, to cause execution or initiation of a defined action in response to the evaluation. Alternatively or additionally, the at least one slave device $150_1'$, $150_1''$, and $150_1'''$ may have the following further features:
- a further second evaluation and control unit 290, or 350;
- a further second switching means, 310 or 340, connected into the current loop 140 and actuable by the further second evaluation and control unit 290 or 350, respectively; and
- a further third switching means 320 actuable by the further second evaluation and control unit 290 or 350, which may be connected in series with or in parallel to the third switching means $250_1$, $250_n$, although it is also possible for one of the two switching means to be omitted; wherein the further second evaluation and control unit 290 or 350 is configured to temporarily close and then reopen the third switching means 320 during a system configuration detection phase; and wherein the first evaluation and control unit 60 and the further first evaluation and control unit 380 are each configured to detect when the at least one slave device $150_1'$, $150_1''$, or $150_1'''$ is connected to the current loop 140; and

- a further second current detection means 300 or 330, connected into the current loop 140, which is connected to the further second evaluation and control unit 290 or 350, respectively, wherein the further second evaluation and control unit 290 or 350 is configured to evaluate the current detected by the further second current detection means 300 or 330, and, for example, to cause execution of a defined action in response to the evaluation result.

The current loop 140 is preferably terminated by a termination means 270. In particular, the termination means is an electrical resistor of a defined size.

According to one aspect of the invention, a master device 20 is provided, which is configured for being used in a communication system 10 according to any one of claims 2 to 13. In particular, it has the following features:

- a first evaluation and control unit 60;
- a first switching means 110 connectable into a current loop 140, actuable by the first evaluation and control unit 60, and configured to open and close the current loop 140 for transmitting data;
- an electrical current source 100 connectable to the current loop 140 and configured to inject a constant quiescent current into the current loop 140;
- a first current detection means 120 connectable into the current loop 140, which is connected to the first evaluation and control unit 60, the first evaluation and control unit 60 being configured to evaluate the current detected by the first current detection means 120 and to execute or initiate a defined action in response to the evaluation result; and
- a voltage meter 240 connected to the first evaluation and control unit 60, which can be connected to the input of the current loop 140, wherein the first evaluation and control unit 60 is configured to evaluate the voltages measured by the voltage meter 240. Furthermore, the first evaluation and control unit 60 may be configured to cause execution of a defined action, for example in response to the evaluation result.

According to a further aspect, a slave device $150_1$, $150_n$ is provided, which is configured for being used in a communication system 10 according to any one of claims 1 to 13 and which, in particular, has the following features:

- an evaluation and control unit $160_1$, $160_n$;
- a first switching means $200_1$, $200_n$ connectable into the current loop 140, actuable by the evaluation and control unit $160_1$, $160_n$, and configured to open and close the current loop 140 for transmitting data;
- a second switching means $250_1$, $250_n$ actuable by the evaluation and control unit $160_1$, $160_n$, which is configured to short-circuit the current loop 140 when in its closed state; wherein the evaluation and control unit $160_1$, $160_n$ is configured to temporarily close and then reopen the second switching means $250_1$, $250_n$ during a system configuration detection phase;

- a current detection means $170_1$, $170_n$ connectable into the current loop 140 and connected to the evaluation and control unit $160_1$, $160_n$, wherein the evaluation and control unit $160_1$, $160_n$ is configured to evaluate the current detected by the current detection means $170_1$, $170_n$. Furthermore, the evaluation and control unit $160_1$, $160_n$ may be configured to cause execution of a defined action, for example in response to the evaluation result.

According to a further aspect, a method is provided for automatically detecting the configuration of a communication system 10 according to any one of claims 1 to 13, which method comprises in particular the steps of:

a) closing a first switching means 110 of a master device 20 and closing a second switching means $200_1$ and a third switching means $250_1$ of a first slave device $150_1$ connected to the current loop 140, whereby the third switching means $250_1$ short-circuits the current loop 140;

b) transmitting, by the master device 20, a first current-modulated signal via the current loop 140, the signal being received and evaluated by the first slave device 150$_1$;

c) opening, after evaluation of the first current-modulated signal, the third switching means 250$_1$ by the first slave device 150$_1$;

d) detecting, in the master device, whether the first slave device 150$_1$ is connected to the current loop 140.

The connection of the first slave device 150$_1$ may be detected by transmitting state information from the first slave device 150$_1$ to the master device 20 in response to the first current-modulated signal and prior to or after the opening of the third switching means 250$_1$, thereby signaling the master device 20 that the first slave device 150$_1$ is connected to the current loop 140. Optionally, the state information may include further information signaling the master device 20 that the first slave device has requested a state change. Alternatively or additionally, in step d), the master device 20 may detect that the first slave device 150$_1$ is connected to the current loop 140, in response to the opening of the third switching means 250$_1$, as the opening of the third switching means 250$_1$ changes the total resistance of the current loop 140 in a defined manner. This change leads to a voltage change at the input of the current loop 140, which can be detected by the master device 20.

The communication system 10 and therefore also the method are scalable. For this purpose, at least one further slave device 150$_n$ may be looped into the current loop 140 in series with the first slave device 150$_1$, the first slave device 150$_1$ being arranged between the master device 20 and the at least one further slave device 150$_n$. In this case, step a) comprises the closing of a second switching means 200$_n$ and of a third switching means 250$_n$ of the at least one further slave device 150$_n$, whereby the third switching means 250$_n$ of the at least one further slave device 150$_n$ short-circuits the current loop 140, and the method comprises the following further steps, subsequently to step d):

e) transmitting, by the master device 20, a second current-modulated signal via the current loop 140, which signal is received and evaluated by the further slave device 150$_n$;

f) once the second current-modulated signal has been evaluated, opening the third switching means 250$_n$ of the further slave device 150$_n$, by the further slave device 150$_n$;

g) detecting, in the master device, whether the further slave device 150$_n$ is connected to the current loop 140.

The further slave device may be detected as "being connected" by a transmission of state information from the further slave device 150$_n$ to the master device 20 in response to the second current-modulated signal, prior to or after the opening of the third switching means of the further slave device 150$_n$, wherein the state information signals the master device 20 that the further slave device 150$_n$ is connected to the current loop 140. Optionally, the state information may include further information signaling the master device 20 that the further slave device has requested a state change. Alternatively or additionally, in step g), the master device 20 may detect that the first slave device 150$_n$ is connected to the current loop 140, in response to the opening of the third switching means 250$_n$ of the further slave device 150$_n$, as the opening of the third switching means 250$_n$ changes the total resistance of the current loop 140 in a defined manner. This change leads to a voltage change at the input of the current loop 140, which can be detected by the master device 20.

Advantageous method steps include that a system state change can be requested by the first slave device 150$_1$, that the system state change requested by the first slave device 150$_1$ can be signaled to the master device 20, that a system state change can be requested by the further slave device 150$_n$, and that the system state change requested by the further slave device 150$_n$ can be signaled to the master device 20.

If, for example, the entire communication system 10 is in a safe state, then, after execution of step d), the communication system 10 can be set into a defined system state, preferably reset into the operating state, under control of the master device 20. This process can also be referred to as a release of the communication system. Similarly, after execution of step g), the communication system 10 can be set into a defined system state, preferably reset into the operating state, under control of the master device 20.

The invention claimed is:

1. A communication system for current-modulated data transmission between a master device and at least one slave device, the communication system comprising:

a) a current loop;

b) a master device comprising:
   a first evaluation and control unit;
   a first switching means connected into the current loop and actuable by the first evaluation and control unit, which is configured to open and close the current loop for transmitting data;
   an electrical current source connected to the current loop, which is configured to inject a constant quiescent current into the current loop;
   a first current detection means connected into the current loop and connected to the first evaluation and control unit, the first evaluation and control unit being configured to evaluate the current detected by the first current detection means;

c) at least one slave device connected to the current loop and comprising:
   a second evaluation and control unit;
   a second switching means connected into the current loop and actuable by the second evaluation and control unit, which is configured to open and close the current loop for transmitting data;
   a third switching means-actuable by the second evaluation and control unit, which is configured to short-circuit the current loop when in its closed state; wherein the second evaluation and control unit is configured to temporarily close and then reopen the third switching means during a system configuration detection phase, and wherein the first evaluation and control unit is configured to detect when the at least one slave device is connected to the current loop;
   a second current detection means connected into the current loop and connected to the second evaluation and control unit, the second evaluation and control unit being configured to evaluate the current detected by the second current detection means;

(d) wherein at least one of:
   (i) the master device has at least one first output that is controllable by the first evaluation and control unit; and
   (ii) the at least one slave device has at least one second output that is controllable by the second evaluation and control unit (e) wherein:
   (i) the first evaluation and control unit of the master device is able to control the first switching means in a defined manner for generating a state change request signal;

(ii) the second evaluation and control is able to control the second switching means in a defined manner for generating a state change request signal;

(iii) the first evaluation and control unit of the master device is configured to transfer the first output into a safe state in response to a received state change request signal; and (iv) the second evaluation and control is configured to transfer the second output into a safe state in response to a received state change request signal.

2. The communication system as claimed in claim 1, wherein:
the first evaluation and control unit of the master device is configured to open the first switching means in response to a received state change request signal; and
the second evaluation and control unit is configured to open the second switching means in response to a received state change request signal.

3. The communication system as claimed in claim 1, wherein:
the first evaluation and control unit is configured to keep the first in the safe state and at the same time to enable data transmission via the current loop; and
the second evaluation and control unit is configured to keep the second output in the safe state and at the same time to enable data transmission via the current loop.

4. A communication system for current-modulated data transmission between a master device and at least one slave device, the communication system comprising:
a) a current loop;
b) a master device comprising:
a first evaluation and control unit;
a first switching means connected into the current loop and actuable by the first evaluation and control unit, which is configured to open and close the current loop for transmitting data;
an electrical current source connected to the current loop, which is configured to inject a constant quiescent current into the current loop;
a first current detection means connected into the current loop and connected to the first evaluation and control unit, the first evaluation and control unit being configured to evaluate the current detected by the first current detection means;
c) at least one slave device connected to the current loop and comprising:
a second evaluation and control unit;
a second switching means connected into the current loop and actuable by the second evaluation and control unit, which is configured to open and close the current loop for transmitting data;
a third switching means-actuable by the second evaluation and control unit, which is configured to short-circuit the current loop when in its closed state; wherein the second evaluation and control unit is configured to temporarily close and then reopen the third switching means during a system configuration detection phase, and wherein the first evaluation and control unit is configured to detect when the at least one slave device is connected to the current loop;
a second current detection means connected into the current loop and connected to the second evaluation and control unit, the second evaluation and control unit being configured to evaluate the current detected by the second current detection means;

wherein:
the first evaluation and control unit is configured to close the first switching means and to inject predetermined system information into the current loop, during a system configuration detection phase; and
the second evaluation and control unit of the at least one slave device is configured to close the second and third switching means and to reopen the third switching means when it received the predetermined system information, during a system configuration detection phase.

5. A method for automatically detecting the configuration of a communication system for current-modulated data transmission between a master device and at least one slave device, the communication system comprising:
a) a current loop;
b) a master device comprising:
a first evaluation and control unit;
a first switching means connected into the current loop and actuable by the first evaluation and control unit, which is configured to open and close the current loop for transmitting data;
an electrical current source connected to the current loop, which is configured to inject a constant quiescent current into the current loop;
a first current detection means connected into the current loop and connected to the first evaluation and control unit, the first evaluation and control unit being configured to evaluate the current detected by the first current detection means;
c) at least one slave device connected to the current loop and comprising:
a second evaluation and control unit;
a second switching means connected into the current loop and actuable by the second evaluation and control unit, which is configured to open and close the current loop for transmitting data;
a third switching means-actuable by the second evaluation and control unit, which is configured to short-circuit the current loop when in its closed state; wherein the second evaluation and control unit is configured to temporarily close and then reopen the third switching means during a system configuration detection phase, and wherein the first evaluation and control unit is configured to detect when the at least one slave device is connected to the current loop;
a second current detection means connected into the current loop and connected to the second evaluation and control unit, the second evaluation and control unit being configured to evaluate the current detected by the second current detection means;
the method comprising the steps of:
i) closing a first switching means of a master device and closing a second and a third switching means of a first slave device connected to the current loop, whereby the third switching means short-circuits the current loop;
ii) transmitting, by the master device, a first current-modulated signal via the current loop, which signal is received and evaluated by the first slave device;
iii) once the first current-modulated signal has been evaluated, opening the third switching means, by the first slave device;
iv) detecting, in the master device, whether the first slave device is connected to the current loop.

6. The method as claimed in claim 5, further comprising at least one of:
in response to the first current-modulated signal, transmitting, from the first slave device to the master device, state information which signals the master device that the first slave device is connected to the current loop; and in step d), detecting, by the master device and in response to the opening of the third switching means, that the first slave device is connected to the current loop.

7. The method as claimed in claim 6, further comprising at least one of:

in response to the second current-modulated signal, transmitting, from the further slave device to the master device, state information which signals the master device that the further slave device is connected to the current loop; and in step g), detecting, by the master device and in response to the opening of the third switching means of the further slave device, that the further slave device is connected to the current loop;

wherein:

a system state change can be requested by the first slave device;

the system state change requested by the first slave device can be signaled to the master device;

a system state change can be requested by the further slave device; and the system state change requested by the further slave device can be signaled to the master device.

8. The method as claimed in claim 5, wherein:

at least one further slave device is looped into the current loop in series with the first slave device, the first slave device being arranged between the master device and the at least one further slave device;

step a) comprises closing a second and third switching means of the at least one further slave device, whereby the third switching means of the at least one further slave device short-circuits the current loop; and wherein the method further comprises the steps, subsequently to step d) of:

e) transmitting, by the master device, a second current-modulated signal via the current loop, which signal is received and evaluated by the further slave device;

f) once the second current-modulated signal has been evaluated, opening the third switching means of the further slave device, by the further slave device;

g) detecting, in the master device, whether the further slave device is connected to the current loop.

9. The method as claimed in claim 8, further comprising at least one of:

in response to the second current-modulated signal, transmitting, from the further slave device to the master device, state information which signals the master device that the further slave device is connected to the current loop; and in step g), detecting, by the master device and in response to the opening of the third switching means of the further slave device, that the further slave device is connected to the current loop.

10. The method as claimed in claim 8, further comprising:

after execution of step g), setting the communication system into a defined system state, under control of the master device.

11. The method as claimed in claim 5, further comprising:

after execution of step d), setting the communication system into a defined system state, under control of the master device.

* * * * *